Nov. 6, 1934.    A. BOUSFIELD    1,979,364

INFANT SCALE

Filed Dec. 30, 1932

INVENTOR
ALFRED BOUSFIELD
BY
ATTORNEY

Patented Nov. 6, 1934

1,979,364

UNITED STATES PATENT OFFICE 1,979,364

INFANT SCALE

Alfred Bousfield, St. Johnsbury, Vt., assignor to E. and T. Fairbanks and Company, St. Johnsbury, Vt., a corporation of Vermont Application December 30, 1932, Serial No. 649,610

8 Claims. (Cl. 265—27)

This invention relates to improvements in weighing scales and more especially to scales for weighing infants.

An important object of the invention is to provide an efficient scale of the general type referred to herein, which is simple and economical in construction, whereby the parts are generally formed of pressed steel in compact and efficient arrangement so as to produce a structure that will be light in weight and durable.

Another important object is to provide a platform with novel pan or apron support for the purpose of affording effective support to the pan, whereby absolute stability will be rendered thereto, while an infant is being placed in the pan for weighing and removed therefrom.

Another object is to provide means for permitting the scale to be lifted by the pan without displacing any of the scale parts.

Another object is to provide a lever system of simple construction, capable of being easily assembled, and employing an offset arm operatively connected to the beam by a suspension loop with pin-point connection, so as to provide means in efficient and compact form for transmitting the load to the beam.

Another object is to provide a beam with an inclined, graduated face so disposed below the pan as to be unobstructed thereby and in direct line of vision of the operator of the scale.

Another object is to provide means for giving additional transverse support to the body of the pan and, further, for retaining it in its curved form.

Still another object is to provide a beam with full capacity, fractional and tare poises, while no loose weights are used on the beam.

With these and other objects in view, my invention consists in certain novel features of construction and arrangement of parts, hereinafter more fully described, and illustrated in the accompanying drawings, in which,—

Figure 1:
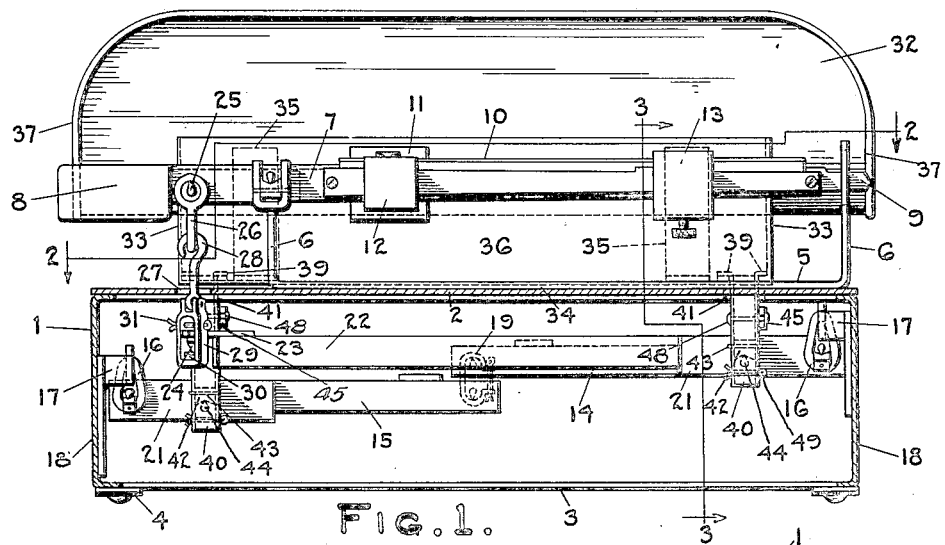
Figure 1 is a longitudinal elevation, partly in section, showing a preferred form of my invention, including the apron or support for the pan.
Figure 2:
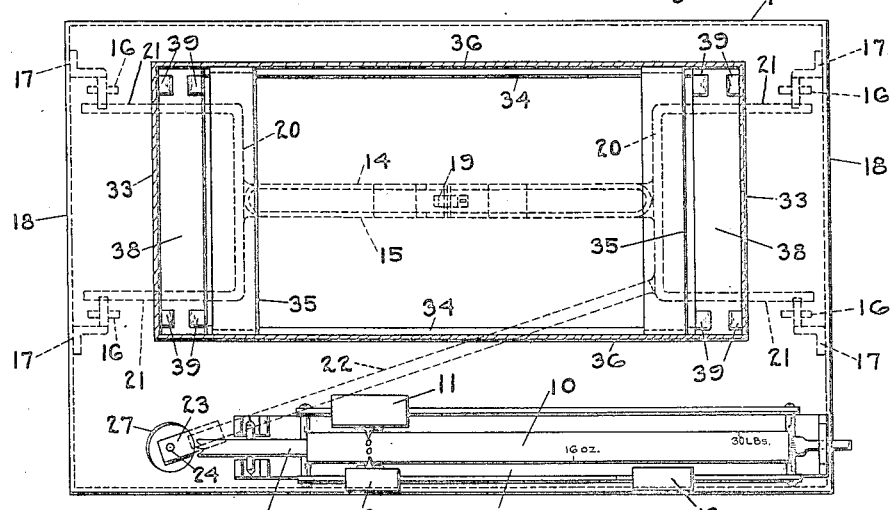
Figure 2 is a plan, partly in section on the line 2—2 of Figure 1, showing particularly the levers and pan retaining means.

Certain elements of the lever system and the beam employed in the present invention, it is to be noted, are identical with those shown in my copending application, Ser. No. 647,177, filed Dec. 14, 1932, which has matured into Patent No. 1,943,651, Jan. 16, 1933.

In the drawings 1 designates a rectangular housing, constructed of sheet metal and provided with a top plate 2 and a bottom plate 3 having a large, rectangular opening 4 therein so as to provide ready access to the weighing mechanism for assembling or adjusting the parts.

Mounted on the top plate 2 is a beam frame 5 provided with upstanding, opposed arms 6, in which is fulcrumed the beam 7 of similar construction to the beam of the above referred to copending application, and having a counterbalance 8, pointed tip 9, also an inclined face plate 10 provided with full capacity and fractional graduations (not shown), together with a full capacity poise 11, fractional poise 12 co-operating with their respective graduations and a tare poise 13. The beam 7 is so positioned below the pan that the inclined face plate 10 is disposed in direct line of vision of the scale operator. Within the housing 1 are located two opposed levers 14 and 15, of substantially the same construction as the levers employed in the above-referred to co-pending application and likewise suspended by suspension loops 16 from sheet metal brackets 17, welded to the sides 18 of the housing, the levers being connected by a center loop 19.

Extending from the lever cross-bar 20 of the butt portion 21 of the lever 14 is an off-set, angularly disposed lever arm 22 provided with an extension plate 23, secured to the free end of the lever arm 22 and provided at its end with a depending pin-point pivot 24 fixedly mounted on the extension plate 23. Suspended from the beam load pivot 25 is a loop 26, from which extends downwardly through an opening 27 in the top plate 2, a hook 28 having a loop 29 pivotally connected to its shank, the loop carrying in its base a bearing 30, in which the pin-point pivot 24 is adapted to rest, thereby forming a sensitive connection between the levers and the beam. In order to prevent the pin-point pivot 24 from becoming disengaged from the bearing 30 a cotter pin 31 is transversely mounted in the loop 29 slightly above the extension plate 23 so as to allow limited play between the parts during their operation.

Figure 3:
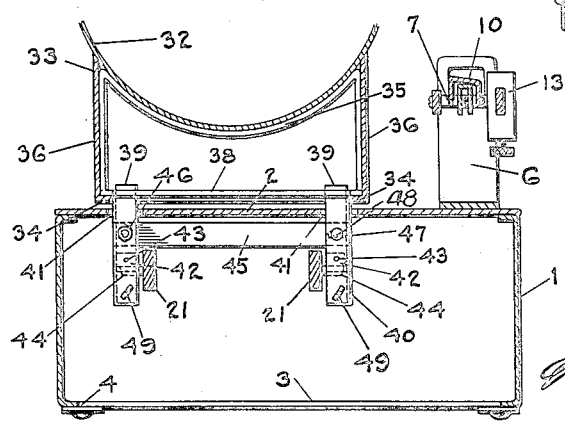
Figure 3 is a cross-section on the line 3—3 of Figure 1 showing the pan supports and the legs in position on the lever arms.

A sheet metal pan 32 is mounted above and lengthwise of the housing 1 and is provided with a depending box-like apron-support 33, (Figs. 1 and 3) welded thereto and extending along the sides of the pan and adjacent to its ends, while the lower turned in edge 34 of the apron is held raised above the top plate, in order to permit free movement of the pan under a load. A sheet metal strip 35 (Fig. 3) is welded to the under side of the pan 32 and sides 36 of the apron 33, adjacent to each end 37 of the pan, being adapted to give additional support to the sheet metal body of the pan as well as to retain it in shape.

In each corner of the apron 33 there is attached to the lower turned in edge 34 of the apron a cross-plate 38, in which are mounted by bent over lugs 39, inserted in openings therein and welded in position, opposed legs 40, which extend through openings 41 in the top plate 2 and are channel-shaped in cross-section, carrying at their lower ends a bearing 42 secured thereto by a pin 43 and seated on a knife-edge pivot 44 extending laterally from each arm 21 of the lever butt portions 20. Below the top plate 2 there is located on the inner side of each pair of opposed legs 40 a cross-bar 45 attached at one end to the legs by a bolt 46 inserted in coinciding openings in the bar and one leg, while the other end of the bar is forked and its slotted opening 47 engages a fixed pin 48 mounted in the other leg. By this arrangement the cross-bars 45 are in a position just below the top plate 2 where they can readily engage the top plate and thus permit the scale to be lifted by the pan without displacing the pan or the scale mechanism. Moreover, a cotter pin 49 is inserted in each leg 40 just below the bearing 41, which serves to prevent displacement of the co-operating pivot 44 from the bearing.

While I have shown a preferred embodiment of my invention it is evident that modifications of the invention may be made that will come within the scope of the invention and, therefore, I do not desire to limit the invention to the exact form of construction shown and described herein.

I claim:

1. In a weighing scale, a housing, a pan mounted above and lengthwise of the said housing, a depending apron-support attached to the bottom of the pan, a cross-plate mounted at each end of the apron, and spaced legs mounted at the ends of each cross-plate whereby direct extended support is given to the body of the said apron.

2. In a weighing scale, a housing, a pan mounted above and lengthwise of the said housing, a depending apron-support attached to the bottom of the pan, a cross-plate mounted at each end of the apron and adapted to afford extended support to the body of the said apron, spaced legs provided with bent over, spaced lugs inserted in spaced openings in the ends of each cross-plate and welded thereto.

3. In a weighing scale, a housing, a pan mounted above and lengthwise of the said housing, a depending apron-support attached to the bottom of the pan, a cross-plate mounted at each end of the apron and adapted to afford extended support to the body of the said apron, spaced legs channel-shaped in section and attached to the ends of each cross-plate, each leg carrying a bearing at its lower end.

4. In a weighing scale, a housing, opposed levers within the housing, a pan mounted above and lengthwise of the said housing, a depending apron-support attached to the bottom of the pan, a cross-plate mounted at each end of the apron, and spaced legs channel-shaped in section and attached to the ends of each cross-plate, each leg carrying a bearing at its lower end pivotally mounted on one of the said levers, the said cross-plates and legs directly supporting the body of the said apron.

5. In a weighing scale, a housing, opposed levers within the housing, a pan mounted above and lengthwise of the said housing, a depending apron-support attached to the bottom of the pan, a cross-plate mounted at each end of the apron, spaced legs channel-shaped in section and attached to the ends of each cross-plate, each leg carrying a bearing at its lower end pivotally mounted on one of the said levers, and means for retaining the bearing and pivot in position.

6. In a weighing scale, a housing, a pan mounted above and lengthwise of the said housing, a depending apron-support attached to the bottom of the pan, a cross-plate mounted at each end of the apron, spaced legs mounted at the ends of each cross-plate, and means for permitting the scale to be lifted by the pan comprising a cross-bar disposed below the top of the housing and secured to the inner side of the upper portion of each pair of spaced legs and adapted in its operative position to be raised and to engage the said top of the housing when the scale is being lifted by the pan.

7. In a weighing scale, a housing, a pan mounted above and lengthwise of the said housing, a depending apron-support attached to the bottom of the pan, a cross-plate mounted at each end of the apron, spaced legs mounted at the ends of each cross-plate, and means for permitting the scale to be lifted by the pan comprising a cross-bar detachably mounted on each pair of legs below the top of the housing and adapted to engage the said top of the housing when the scale is being lifted by the pan.

8. In a weighing scale, a housing, a pan mounted above and lengthwise of the said housing, a depending apron-support attached to the bottom of the pan, a cross-plate mounted at each end of the apron, spaced legs mounted at the ends of each cross-plate, and means for permitting the scale to be lifted by the pan comprising a cross-bar located below the top of the housing and attached at one end to one of each pair of legs and having its opposite end forked and engaging a fixed pin in the other leg, the said cross-bar being adapted to engage the top of the said housing when the scale is being lifted by the pan.

ALFRED BOUSFIELD.